(12) United States Patent
Burke

(10) Patent No.: US 10,394,205 B2
(45) Date of Patent: Aug. 27, 2019

(54) SYSTEMS AND METHODS FOR REAL-TIME CONTROL

(71) Applicant: Virtual Peaker, Inc., Louisville, KY (US)

(72) Inventor: William J. Burke, Louisville, KY (US)

(73) Assignee: Virtual Peaker, Inc., Louisville, KY (US)

( * ) Notice: Subject to any disclaimer, the term of this patent is extended or adjusted under 35 U.S.C. 154(b) by 0 days.

(21) Appl. No.: 15/818,864

(22) Filed: Nov. 21, 2017

(65) Prior Publication Data

US 2018/0150040 A1    May 31, 2018

Related U.S. Application Data

(60) Provisional application No. 62/427,549, filed on Nov. 29, 2016.

(51) Int. Cl.
  *G05B 15/02*   (2006.01)
  *G05B 19/418*  (2006.01)
  *H04L 29/08*   (2006.01)

(52) U.S. Cl.
  CPC ........ *G05B 15/02* (2013.01); *G05B 19/4185* (2013.01); *G05B 2219/31101* (2013.01); *H04L 67/02* (2013.01); *Y02P 90/18* (2015.11)

(58) Field of Classification Search
  CPC .... G05B 19/4185; G05B 15/02; G05B 11/00; G05B 6/00; G05B 11/36; G05B 11/38; G05B 11/40; G05B 11/42; G05B 19/41855; G05B 2219/31088; G05B 2219/31092; G05B 2219/31102; G05B 2219/31105; G05B 2219/31115; G05B 2219/31156; G05B 2219/31158; G05B 2219/31167; G05B 2219/31227; G05B 2219/31346

See application file for complete search history.

(56) References Cited

U.S. PATENT DOCUMENTS 5,963,447 A    10/1999  Kohn et al.
6,088,689 A     7/2000  Kohn et al.
6,370,572 B1    4/2002  Lindskog et al.
(Continued)

FOREIGN PATENT DOCUMENTS

JP    H0614458 A    1/1994

*Primary Examiner* — Thomas C Lee
*Assistant Examiner* — Charles Cai
(74) *Attorney, Agent, or Firm* — Dinsmore & Shohl LLP

(57) ABSTRACT

Systems and methods for real time control are provided. One embodiment includes executing a first control cycle that includes retrieving an input message, where the input message includes an identifier of a network device with an input and an actuator and retrieving a context object that includes a serialized controller data structure from a previous control sample. The first control cycle may additionally include retrieving data related to the input for the network device and bundle the data related to the input with the serialized controller data structure into a run message, de-serializing the serialized controller data structure, and using the controller data structure in conjunction with the data related to the input to determine a new actuator position of the actuator. In some embodiments, the first control cycle includes updating and serializing the controller data structure and causing the actuator to be set to the new actuator position.

20 Claims, 4 Drawing Sheets

(56) References Cited

U.S. PATENT DOCUMENTS

| | | | |
|---|---|---|---|
| 6,799,077 B1* | 9/2004 | Hauet | G05B 19/042 |
| | | | 370/459 |
| 6,934,862 B2 | 8/2005 | Sharood et al. | |
| 7,181,302 B2 | 2/2007 | Bayne | |
| 7,526,539 B1 | 4/2009 | Hsu | |
| 7,844,370 B2 | 11/2010 | Pollack et al. | |
| 8,013,732 B2* | 9/2011 | Petite | G01D 4/004 |
| | | | 340/539.1 |
| 2006/0031643 A1* | 2/2006 | Figueira | G06F 13/387 |
| | | | 711/154 |
| 2006/0038672 A1 | 2/2006 | Schoettle | |
| 2010/0076617 A1* | 3/2010 | Van Den Keybus | |
| | | | G05B 19/042 |
| | | | 700/297 |
| 2010/0114387 A1 | 5/2010 | Chassin | |
| 2013/0325997 A1 | 12/2013 | Higgins et al. | |
| 2015/0106616 A1* | 4/2015 | Nix | H04W 4/70 |
| | | | 713/156 |
| 2015/0134733 A1* | 5/2015 | Maturana | H04L 43/04 |
| | | | 709/203 |
| 2015/0323913 A1* | 11/2015 | Gilmore | G05B 13/04 |
| | | | 700/275 |
| 2015/0378356 A1* | 12/2015 | Hefeeda | G05B 19/0426 |
| | | | 700/9 |
| 2016/0274552 A1* | 9/2016 | Strohmenger | G05B 11/01 |

* cited by examiner

SYSTEMS AND METHODS FOR REAL-TIME CONTROL

CROSS REFERENCE

This application claims the benefit of U.S. Provisional Ser. No. 62/427,549, filed Nov. 29, 2016, which is hereby incorporated by reference in its entirety.

TECHNICAL FIELD

Embodiments described herein generally relate to systems and methods for real time control and, more specifically, to embodiments of scalable real time control.

BACKGROUND

A real-time control system is used to control a device, or series of devices, based on inputs from the devices. A real-time control system must perform a series of operations repeatedly in a timed loop or control cycle. The general operations of a real-time control system typically follow the following pattern: receive inputs from the sensors/devices, perform a series of control calculations, adjust the actuators, etc. For a real-time control system to be effective the three operations must be repeated in a timed loop, with the sample time being small relative to the natural frequency of the system.

Control systems require knowledge of previous sample loops in successive sample loops, meaning the systems require memory. This is usually accomplished by reserving memory in a computer system and reusing it for each successive loop. The typical problem with operating many independent real-time control systems in a server based environment is that it would require that servers be instantiated with a persistent process (or thread) for each control system. The memory usage as compared to the processing usage of this type of server based system is very large, and results in considerable wasted capacity. Further, the start-up and shutdown for such a system would tend to make it fragile in a cloud based environment, and this leads to a lack of scalability.

SUMMARY

Systems and methods for real time control are provided. One embodiment of a method includes executing a first control cycle that includes retrieving an input message, where the input message includes an identifier of a network device that includes an input and an actuator and retrieving a context object that includes a serialized controller data structure from a previous control sample of the network device. The first control cycle may additionally include retrieving data related to the input for the network device and bundle the data related to the input with the serialized controller data structure into a run message, de-serializing the serialized controller data structure, and using the controller data structure in conjunction with the data related to the input to determine a new position for the actuator. In some embodiments, the first control cycle includes updating and serializing the controller data structure and causing the actuator to be set to the new actuator position.

One embodiment of a system includes a network device that includes an actuator, an input, and a first computing device that is remotely located from the network device and includes a memory component and a processor. The memory component stores input queue worker logic that, when executed by the processor causes the system to retrieve an input message from an input queue, where the input message includes an identifier of the network device. The input queue worker logic may additionally cause the system to retrieve a context object, where the context object includes a serialized controller data structure from a previous control sample of the network device and where the context object includes an identification of the input for the network device. The input queue worker logic may cause the system to retrieve data related to the input for the network device and bundle the data related to the input with the serialized controller data structure into a run message and place the run message into a run queue. The memory component may further store run queue worker logic that, when executed by the processor causes the system to de-serialize the serialized controller data structure, use the controller data structure in conjunction with the input to determine a new position for the actuator, and update and serialize the controller data structure. In some embodiments, the run queue worker logic causes the system to create an output message that includes the new actuator position and the updated controller data structure and send the output message to an output queue. The system may additionally include output queue worker logic that, when executed by the processor, causes the system to retrieve the output message from the output queue, cause the actuator to be set to the new actuator position, and store the updated controller data structure.

Another embodiment of a system includes a first server that is communicatively coupled to a network device that includes an actuator and an input. The first server may include a first memory component and a first processor. The first memory component stores logic for executing a first control cycle for the network device that, when executed by the first processor, causes the system to retrieve an input message, where the input message includes an identifier of the network device. The logic may further cause the system to retrieve a context object that includes a serialized controller data structure from a previous control sample of the network device, where the context object includes an identification of the input for the network device. In some embodiments, the logic causes the system to retrieve data related to the input for the network device and bundle the data related to the input with the serialized controller data structure into a run message, and use the controller data structure in conjunction with the data related to the input to determine a new position for the actuator. In some embodiments, the logic causes the system to update the controller data structure, cause the actuator to be set to the new actuator position, and store the updated controller data structure. Embodiments of the system may additionally include a second server that is communicatively coupled to the network device that includes a second memory component and a second processor, where the second memory component stores logic that, when executed by the second processor, causes the system to execute a second control cycle for the network device.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for real time control (RTC). Current implementations of RTC systems instantiate memory resources of a server, which must be kept occupied throughout several control cycles of the RTC system, which can be taxing on the hardware. Embodiments described herein include a scalable RTC system that may be configured such that any control cycle is able to run on any server in the set. Accordingly, embodiments may run a plurality of real time control (RTC) systems across a plurality of servers without losing data (virtualized and independent of hardware). Thus, these embodiments may be configured to execute functionality for a control cycle, such as a first control cycle via a first computing device, such as a first server with a first memory component and a first processor and another control cycle, such as a second control cycle via a second computing device such as a second server with a second memory component and a second processor. To accomplish this, these embodiments may utilize a multitude of first-in-first-out (FIFO) queues and controller data structure serialization and/or chained hypertext transfer protocol (HTTP) requests. The systems and methods for providing real time control incorporating the same will be described in more detail, below.

Figure 1:
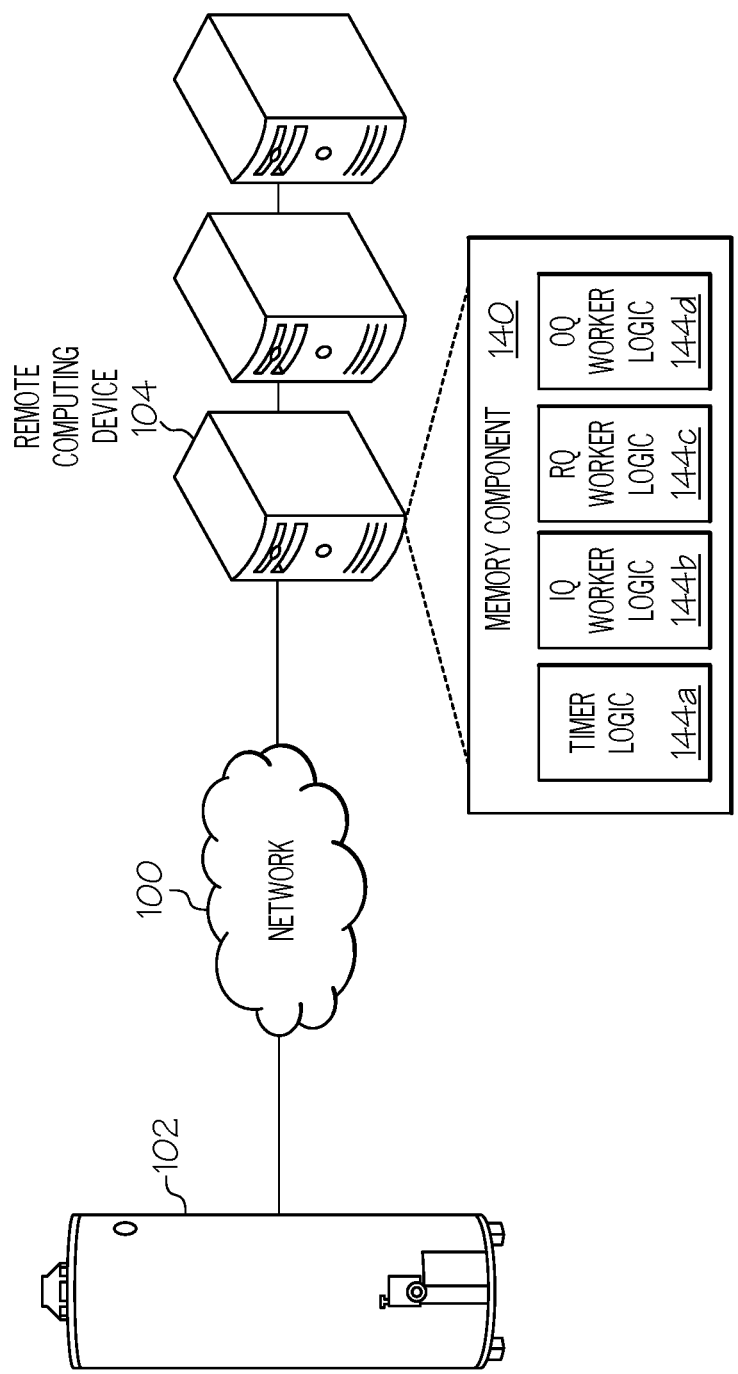
FIG. 1 depicts a networking environment for real time control, according to embodiments described herein.

Referring now to the drawings, FIG. 1 depicts a networking environment for real time control, according to embodiments described herein. As illustrated, a network 100 may include a wide area network (WAN) and/or a local network (such as a local area network, a Bluetooth network, a ZigBee network, and/or the like). Also included is a network device 102, which may include any device that includes an actuator for control via real time control. While a water heater is depicted in FIG. 1, this is just an example. Any device or system, such as heating ventilation and cooling (HVAC) systems, washers, dryers, lights, batteries, etc. may be included, so long as the network device 102 includes an actuator and is configured for real-time control, as described herein.

Also coupled to the network 100 is a remote computing device 104 (or a plurality of remote computing devices) that may include one or more remote database and are configured to operate as a control system to control the network device 102 (or plurality of different control systems to control a plurality of different network devices). As illustrated, the remote computing device 104 may include a memory component 140, which stores timer logic 144a, input queue (IQ) worker logic 144b, run queue (RQ) worker logic 144c, and output queue (OQ) worker logic 144d. As described in more detail below, the timer logic 144a may facilitate the creation of an input queue, as well as input messages into the input queue. In some embodiments, the timer logic 144a may be configured to start a timer and/or facilitate utilization of a self-starting timer. The input queue may operate as a first-in first-out (FIFO) queue or as an HTTP request and may receive messages and other data provided by the timer logic 144a. The IQ worker logic 144b compiles input data and other information for sending to a run queue (or via an HTTP request). The RQ worker logic 144c causes the sending of output and serialized controller data structure (with historical states of the controller and outputs from a previous implementation) into an output queue (or via an HTTP request). The OQ worker logic 144d is configured to cause the remote computing device 104 to set actuators and thus implement control of the network device 102.

Figure 2:
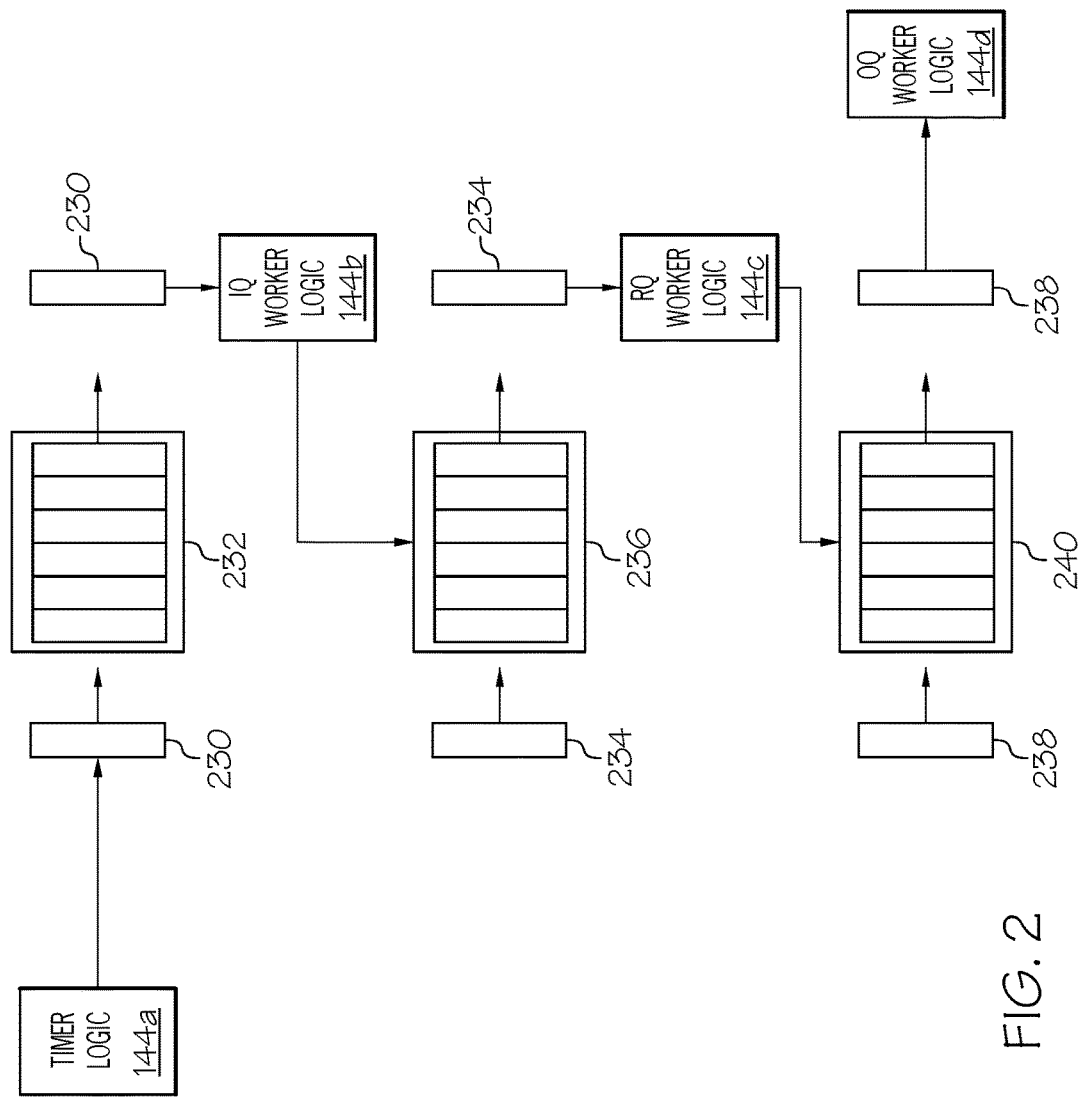
FIG. 2 depicts a flow diagram for providing real time control, according to embodiments described herein.

FIG. 2 depicts a flow diagram for providing real time control, according to embodiments described herein. As illustrated, the timer logic 144a may cause the remote computing device 104 to put a message 230 into an input queue 232 to begin the sample for a specific control system. As described above, the input queue 232 may be configured as a FIFO queue. The control system that is to be implemented is identified by an identifier found in a database (such as in the data storage component 436 in FIG. 4 or an external database).

When the message 230 is set to leave the input queue 232, the IQ worker logic 144b causes the remote computing device 104 to remove the message 230 from the input queue 232 for processing. Based on the identifier found in the message 230, IQ worker logic 144b may retrieve a context object from a database. The context object contains the serialized controller data structure from the previous control sample and a list of required inputs for the control system. Additionally, the IQ worker logic 144b causes the gathering of the inputs for the control system based on the requirements in the context. The IQ worker logic 144b additionally causes the bundling of the new inputs with the serialized controller data structure and creates a new message 234 for a run queue 236.

Once the new message 234 leaves the run queue 236, the RQ worker logic 144c causes the remote computing device 104 to take the new message from the run queue 236 for processing. The RQ worker logic 144c causes the remote computing device 104 to de-serialize the controller data structure and use the de-serialized controller data structure in conjunction with the inputs of the control system to compute the new actuator positions for the network device 102. The RQ worker logic 144c additionally causes the remote computing device 104 to create a new message 238 and place the new message 238 onto an output queue 240 with newly updated controller data structure and actuator positions.

The OQ worker logic 144d causes the remote computing device 104 to take the new message 238 off the output queue 240 for processing. Additionally, the OQ worker logic 144d causes the remote computing device 104 to set the actuators based on the serialized commands in the message. The OQ worker logic 144d additionally causes the remote computing device 104 to store the serialized controller data structure in the database for future processing.

As illustrated in the example of FIG. 2, embodiments described herein may utilize a separate RTC system for each facility, such as a house, building, office, etc. Accordingly, past data about a single facility may be stored at the facility and/or remotely. Regardless, these embodiments may gather inputs, compute a new controller state and serialize controller data structure, such that inputs and controller data structure are received together.

Figure 3:
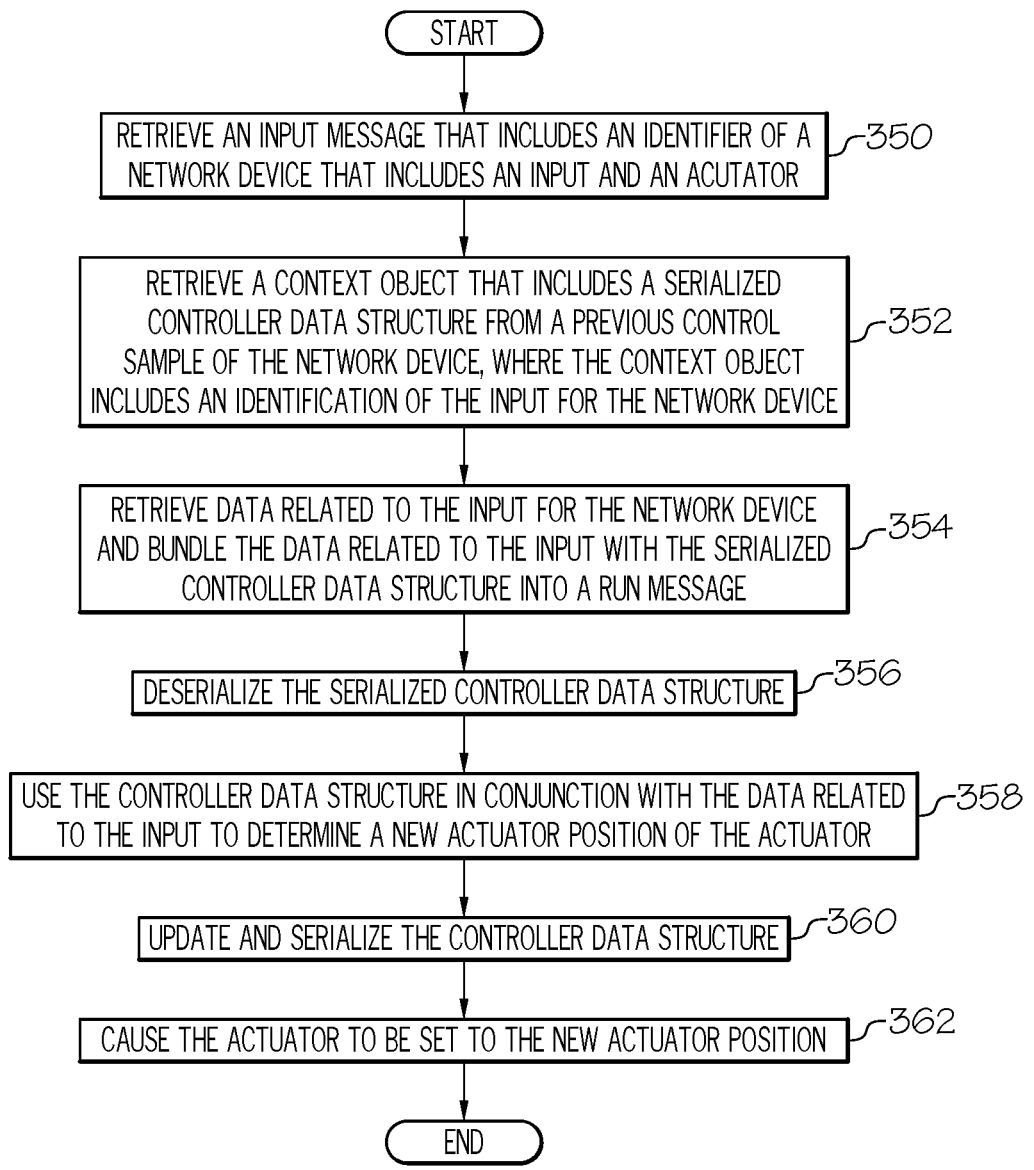
FIG. 3 depicts a flowchart for providing real time control, according to embodiments described herein.

FIG. 3 depicts a flowchart for providing real time control, according to embodiments described herein. As illustrated at block 350, an input message may be retrieved that includes an identifier of a network device that includes an input and an actuator. In block 352, a context object may be retrieved that includes a serialized controller data structure from a previous control sample of the network device, where the context object includes an identification of the input for the network device 102. In block 354, data related to the input for the network device 102 may be retrieved and the data related to the input may be bundled with the serialized controller data structure into a run message. In block 356, the serialized controller data structure may be de-serialized. In block 358, the controller data structure may be used in conjunction with the data related to the input to determine a new actuator position of the actuator. In block 360, the controller data structure may be updated and serialized. In block 362, the actuator may be set to the new actuator position. This may be accomplished by creating an output message that includes the new actuator position and the updated controller data structure and sending the output message to an output queue.

Figure 4:
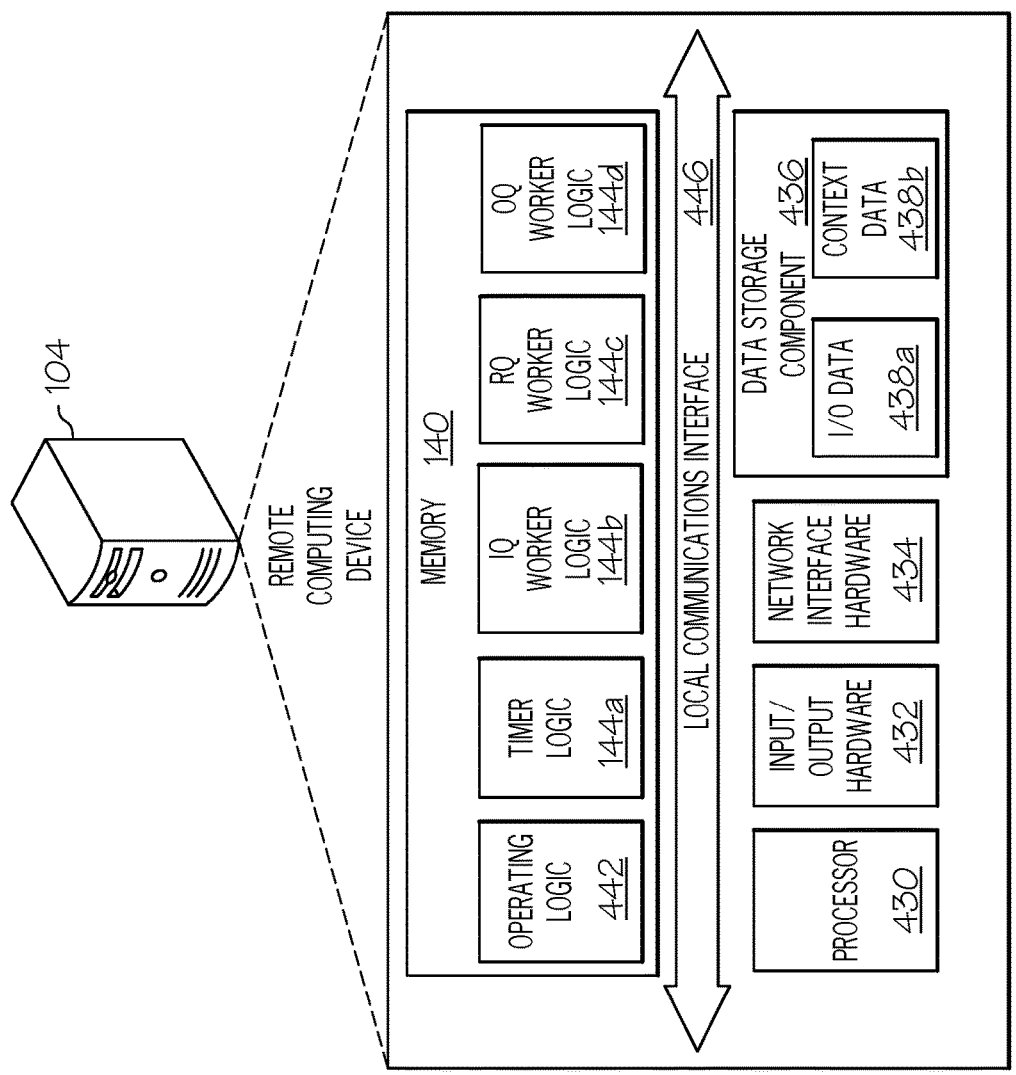
FIG. 4 depicts a computing device for providing real time control, according to embodiments described herein.

FIG. 4 depicts a remote computing device 104 for providing real time control, according to embodiments described herein. As illustrated, the remote computing device 104 includes a processor 430, input/output hardware 432, the network interface hardware 434, a data storage component 436 (which stores input/output data 438a, context data 438b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating logic 442, the timer logic 144a, the IQ worker logic 144b, the RQ worker logic 144c, and the OQ worker logic 144d. The timer logic 144a, the IQ worker logic 144b, the RQ worker logic 144c, and the OQ worker logic 144d may each include a plurality of different pieces of logic, each of which may be embodied as a computer program, firmware, and/or hardware, as an example. A local interface 446 is also included in FIG. 4 and may be implemented as a bus or other communication interface to facilitate communication among the components of the remote computing device 104.

The processor 430 may include any processing component operable to receive and execute instructions (such as from a data storage component 436 and/or the memory component 140). The input/output hardware 432 may include and/or be configured to interface with microphones, speakers, a display, and/or other hardware.

The network interface hardware 434 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the remote computing device 104 and other computing devices, such as the network device 102.

The operating logic 442 may include an operating system and/or other software for managing components of the remote computing device 104. As also discussed above, timer logic 144a, the IQ worker logic 144b, the RQ worker logic 144c, and the OQ worker logic 144d may reside in the memory component 140 and may be configured to perform the functionality, as described herein.

It should be understood that while the components in FIG. 4 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the timer logic 144a, the IQ worker logic 144b, the RQ worker logic 144c, and the OQ worker logic 144d may reside on a plurality of computing devices. As an example, one or more of the functionalities and/or components described herein may be provided by a remote computing device 104 and/or network device 102, which may be coupled to the remote computing device 104 via the network 100. Additionally, as is evident, the timer logic 144a, the IQ worker logic 144b, the RQ worker logic 144c, and the OQ worker logic 144d may reside on a plurality of remote computing devices 104 that provide the ability to utilize the efficiencies described herein. As such, each of the individual components can be scaled independently depending on memory, input/output, and CPU requirements of each piece of queue worker logic. Accordingly, each queue worker logic may be operated in different scalable layers (of servers) optimized for their individual workloads.

Additionally, while the remote computing device 104 is illustrated with the timer logic 144a, the IQ worker logic 144b, the RQ worker logic 144c, and the OQ worker logic 144d as separate logical components, this is also an example. In some embodiments, a single piece of logic (and/or or several linked modules) may cause the remote computing device 104 to provide the described functionality.

As illustrated above, various embodiments for real time control are disclosed. These embodiments result in a perfectly scalable server based system where the servers do not require persistent memory for individual control systems; any control system can run on any server; and the number of servers can be scaled independently of any other variable.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for real time control. It should also be understood that these embodiments are merely exemplary and are not intended to limit the scope of this disclosure.

What is claimed is:
1. A method for real time control comprising:
executing, by a first computing device, a first control cycle that includes at least the following:
retrieving an input message, wherein the input message includes an identifier of a network device that includes an input and an actuator;
retrieving a context object from the identifier in the input message that includes a serialized controller data structure from a previous control sample of the network device and a list of required inputs for the control system;
gathering new inputs for the control system based on the requirements in the context object and bundling the new inputs with the serialized controller data structure into a run message;
de-serializing the serialized controller data structure;

using the controller data structure in conjunction with the new inputs to determine a new actuator position of the actuator;

updating and serializing the controller data structure; and causing the actuator to be set to the new actuator position; and executing, by a second computing device, a second control cycle for the network device.

2. The method of claim 1, further comprising causing a timer to begin the first control cycle.

3. The method of claim 1, further comprising using a hypertext transfer protocol request to begin the first control cycle.

4. The method of claim 1, further comprising:
creating, by the first computing device, an output message that includes the new actuator position and the updated controller data structure; and
sending the output message to an output queue.

5. The method of claim 1, further comprising storing, by the first computing device, the updated controller data structure.

6. The method of claim 1, further comprising calculating a time for beginning the second control cycle from within the first control cycle.

7. The method of claim 1, further comprising, adjusting by the network device, the actuator to the new actuator position.

8. A system for real time control comprising:
a network device that includes an actuator and an input; and
a first computing device that is remotely located from the network device and includes a memory component and a processor, wherein the memory component stores at least the following for executing a control cycle of the network device:
input queue worker logic that, when executed by the processor causes the system to perform at least the following:
retrieve an input message from an input queue, wherein the input message includes an identifier of the network device;
retrieve a context object identified from the identifier in the input message, wherein the context object includes a serialized controller data structure from a previous control sample of the network device and wherein the context object includes an identification of the input for the network device;
gather new inputs for the control system based on the requirements in the context object and bundle the new inputs with the serialized controller data structure into a run message; and
place the run message into a run queue;
run queue worker logic that, when executed by the processor causes the system to perform at least the following:
de-serialize the serialized controller data structure;
use the controller data structure in conjunction with the new inputs to determine a new actuator position of the actuator;
update and serialize the controller data structure;
create an output message that includes the new actuator position and the updated controller data structure; and
send the output message to an output queue;
output queue worker logic that, when executed by the processor, causes the system to perform at least the following:
retrieve the output message from the output queue;
cause the actuator to be set to the new actuator position; and
store the updated controller data structure.

9. The system of claim 8, wherein a subsequent control cycle for the network device is run on a second computing device that is different than the first computing device.

10. The system of claim 8, wherein at least one of the following is a first-in-first-out queue: the input queue, the run queue or the output queue.

11. The system of claim 8, wherein the control cycle is initiated via a self-starting timer.

12. The system of claim 8, wherein the input message further includes a timer to begin the control cycle.

13. The system of claim 8, wherein at least one of the following operates as a hypertext transfer protocol request: the input queue, the run queue or the output queue.

14. The system of claim 8, further comprising a remote database, wherein the serialized controller data structure is retrieved from the remote database.

15. A system for real time control comprising:
a first server that is communicatively coupled to a network device that includes an actuator and an input, wherein the first server includes a first memory component and a first processor, wherein the first memory component stores logic for executing a first control cycle for the network device that, when executed by the first processor, causes the system to perform at least the following:
retrieve an input message, wherein the input message includes an identifier of the network device;
retrieve a context object using the identifier from the input message that includes a serialized controller data structure from a previous control sample of the network device, wherein the context object includes an identification of the input for the network device;
gather new inputs for the control system based on the requirements in the context object and bundle the data related to the input with the serialized controller data structure into a run message;
use the controller data structure in conjunction with the new inputs to determine a new actuator position of the actuator;
update the controller data structure;
cause the actuator to be set to the new actuator position; and
store the updated controller data structure; and
a second server that is communicatively coupled to the network device that includes a second memory component and a second processor, wherein the second memory component stores logic that, when executed by the second processor, causes the system to execute a second control cycle for the network device.

16. The system of claim 15, wherein the logic further causes the system to perform at least the following:
create an output message that includes the new actuator position and the updated controller data structure; and
send the output message to an output queue.

17. The system of claim 15, wherein the logic further causes a timer to begin the first control cycle.

18. The system of claim 15, further comprising a remote database, wherein the serialized controller data structure is retrieved from the remote database.

19. The system of claim 15, further comprising the network device.

20. The system of claim 15, wherein the logic further causes the system to calculate a time for beginning the second control cycle from within the first control cycle.

\* \* \* \* \*